United States Patent [19]
Levendis

[11] Patent Number: 5,785,936
[45] Date of Patent: Jul. 28, 1998

[54] SIMULTANEOUS CONTROL OF $SO_2$, $NO_x$, HCL, AND PARTICULATES BY IN-FURNACE HIGH-TEMPERATURE SORBENT INJECTION AND PARTICULATE REMOVAL

[75] Inventor: Yiannis A. Levendis, Boston, Mass.

[73] Assignee: Northeastern University, Boston, Mass.

[21] Appl. No.: 747,353

[22] Filed: Nov. 12, 1996

Related U.S. Application Data

[63] Continuation-in-part of Ser. No. 349,081, Dec. 2, 1994, abandoned.

[51] Int. Cl.[6] .................. B01D 53/46; B01D 53/81; B01D 46/00
[52] U.S. Cl. .................. 423/210; 423/239.1; 423/244.01; 423/240 S; 423/215.5; 95/113; 95/277; 95/280; 95/285; 110/203; 110/217
[58] Field of Search .................. 423/239.1, 244.01, 423/244.07, 215.5, 240 S, 210; 110/211, 217, 203; 95/113, 277, 280, 285

[56] References Cited

U.S. PATENT DOCUMENTS

| | | | |
|---|---|---|---|
| 4,197,278 | 4/1980 | Gehri et al. | 423/242 |
| 4,581,210 | 4/1986 | Teller | 423/242 |
| 4,599,952 | 7/1986 | Meier | 110/216 |
| 4,793,981 | 12/1988 | Doyle et al. | 423/239 |
| 5,013,340 | 5/1991 | Taslim et al. | 55/290 |
| 5,114,581 | 5/1992 | Goldsmith et al. | 210/650 |
| 5,253,476 | 10/1993 | Levendis et al. | 60/279 |
| 5,312,605 | 5/1994 | Levendis et al. | 423/210 |
| 5,352,423 | 10/1994 | Levendis et al. | 423/235 |
| 5,443,805 | 8/1995 | Beer et al. | 423/235 |

FOREIGN PATENT DOCUMENTS

| | | | |
|---|---|---|---|
| 31 18 478 A1 | 11/1982 | Germany | 95/280 |
| 54-9166 | 1/1979 | Japan | 95/113 |
| 62-169922A | 7/1987 | Japan . | |

OTHER PUBLICATIONS

Stieglitz et 1. "On the De-Novo Synthesis of PCDD/PCDF . . . " Chemosphere vol. 18 Nos. 1-6, pp. 1219-1226, 1989 no month.
Pergamon Press PLC. Printed in Great Britain.
Yiannis A. Levendis et al., Effectiveness of Calcium Magnesium Acetate as an $SO_x$ Sorbent in Coal Combustion, ALChE Journal, May 1993, vol. 39, No. 5, pp. 761-773.

*Primary Examiner*—Gary P. Straub
*Assistant Examiner*—Timothy C. Vanoy
*Attorney, Agent, or Firm*—Weingarten, Schurgin, Gagnebin & Hayes LLP

[57] ABSTRACT

A method for the simultaneous control of $SO_2$, $NO_x$, HCl, air toxins, metal fumes, and particulate emissions (ash, soot, metal oxides) from fossil fuel burning combustion processes is provided by injecting a sorbent upstream of a filter in the furnace and collecting sorbent and particulates in the filter. Collecting the sorbent in the filter increases its residence time in the process. The sorbent is injected in the post-flame region of a furnace, where it reacts with the $SO_2$, the $NO_x$, the HCl, and the air toxics in the effluent gas. A surface filter that can withstand temperatures of approximately 1000° C. is mounted, either fixedly or rotatably, in the furnace downstream of the sorbent injection region. The gas flows through the filter, and the sorbent and other particulates become embedded in the surface layer of the filter. Gases continue to flow through the filter past the embedded sorbent, where the reactions with the sorbent may continue for a long time, on the order of minutes, allowing high utilization of the sorbent to be achieved. The filter is periodically cleaned aerodynamically with a counterflow stream of compressed air, blown in pulses, through a section of the filter. Dislodged particulates are collected in a hopper.

13 Claims, 8 Drawing Sheets

SIMULTANEOUS CONTROL OF $SO_2$, $NO_x$, HCL, AND PARTICULATES BY IN-FURNACE HIGH-TEMPERATURE SORBENT INJECTION AND PARTICULATE REMOVAL

CROSS REFERENCE TO RELATED APPLICATIONS

This application is a continuation-in-part of U.S. patent application Ser. No. 08/349,081, filed on Dec. 2, 1994 now abandoned, the disclosure of which is incorporated by reference herein.

STATEMENT REGARDING FEDERALLY SPONSORED RESEARCH OR DEVELOPMENT

None.

FIELD OF THE INVENTION

This invention relates to the field of pollution control and more particularly to the control of $SO_2$, $NO_x$, HCl, air toxins (polynuclear aromatic hydrocarbons (PAHs), polychlorinated dibenzo-dioxins and dibenzo-furans, metal fumes), and particulate emissions (ash, soot, metal oxides) from fossil fuel burning combustion processes.

BACKGROUND OF THE INVENTION

Combustion processes which burn coal or other fossil fuels, such as power plants, or waste incinerators emit pollutants including $SO_2$, $NO_x$, HCl, air toxins, and particulates, such as inorganic ash and unburned carbon (soot). The unburned carbon can lead to the formation of polynuclear hydrocarbons, such as polychlorinated dibenzo-dioxins and dibenzo-furans, which are toxic. The control of these pollutants is generally achieved through separate processes.

Flue gas desulfurization processes involve wet or dry low-temperature scrubbing of the flue gases with non-regenerated calcium compounds such as slaked lime (Ca(OH)$_2$) or limestone (CaCO$_3$) slurries. However, scrubbing processes are expensive and capital intensive and are subject to corrosion and plugging problems. Injection of sorbents as a powder comprising porous particles into high-temperature boiler gases has also been investigated, because of the favorable kinetics of the sulfation reactions at high temperatures and the low capital investment. Typical sorbents are calcium-containing compounds such as lime, limestone, dolomite, hydrated lime, and hydrated dolomite. However, sulfation reaction products can fill the surface pores of the particles, leaving the core unreacted. To minimize this waste, the particles must be ground to a few microns, which is costly for the large amount of sorbent required in a power plant. Similar considerations are pertinent to flue-gas dechlorination processes in which lime or limestone may react with hydrogen chloride (HCl) to form stable calcium chloride solids.

$NO_x$ control techniques range from combustion modifications to post-combustion treatments. Combustion modifications include low $NO_x$ burners and staged combustion. However, combustion modifications may be insufficient to meet alone the requirements for $NO_x$ reduction from coal-fired boilers. Hence, these techniques must be supplemented with post-combustion treatments. Post-combustion treatments include selective non-catalytic reduction and selective catalytic reduction, in which nitrogen-containing compounds, such as ammonia and urea, are injected downstream of the boiler. Another post combustion technique involves the injection of secondary fuels in a fuel-rich zone downstream of the primary combustion zone.

Removal of both $SO_2$ and $NO_x$ simultaneously has been studied using a carboxylic acid salt, calcium magnesium acetate (CMA). See U.S. Pat. No. 5,312,605. This sorbent can be dry sprayed as a fine powder or wet sprayed in an aqueous solution into a high temperature environment such as the post combustion zone of a furnace. The cation of the salt forms an oxide which reacts with gaseous sulfur compounds, and the organic ligand acetate volatilizes and pyrolyzes, reducing $NO_x$ to $N_2$. Also, other carboxylic salts of calcium, such as formate, propionate and benzoate, or blends of CaO, MgO, and organics, such as coal, have been found to be effective in reducing the concentration of both $SO_2$ and $NO_x$ emissions upon wet or dry spraying into the furnace. See, for example, U.S. Pat. No. 5,352,423, in which calcium benzoate and calcium magnesium benzoate are disclosed.

However, while both wet and dry sorbent injection processes are simple and require minimal capital costs, the sorbent utilization is often low, because the residence times are short, typically less than 1 second, at the high post flame temperatures, generally around 1000° C., found in boilers. These residence times are too short to allow the sorbent to react completely with the gases, mainly because of pore diffusion limitation. Utilization efficiencies of 20 to 30 percent are typical. Accordingly, large amounts of sorbent are required, and most of the sorbent does not react and is wasted.

In addition, because of the short residence times, small amounts of carbon remain unburned and are carried through the furnace ducts to the particle collection devices, such as electrostatic precipitators or baghouses. The presence of unburned carbon in the effluent proportionally reduces the efficiency of powerplants as well as the marketability of the fly ash. Unburned carbon is also a benzene ring source of the toxic polychlorinated dibenzo-dioxins and dibenzo-furans if chlorine is present in the fuel, and, hence, in the flue gases. Chlorinated compounds are present in various waste products, such as municipal, industrial, or medical waste.

SUMMARY OF THE INVENTION

The present invention provides a system which increases the residence time of the sorbent in the furnace, allowing more sorbent to react with the $SO_2$, $NO_x$, and HCl in the combustion gases. The greater residence time is achieved by fitting a surface filter that can withstand high temperatures in the furnace at a region where the flue gas temperature is at least 500° C. At these temperatures, the sulfation and chlorination kinetics and thermodynamics of calcium and magnesium are favored and unburned carbon (soot) can also be oxidized. Moreover, the polychlorinated dibenzo-dioxin and dibenzo-furan formation reactions occur mostly in the general temperature range of 200° to 400° C. If the precursors to these compounds can be removed at the higher temperatures, above 500° C., the formation of these compounds will be minimized or even prevented as the effluent cools down to the neighborhood of 300° C., which has been identified as the optimum temperature for dioxin formation. See "On the De-Novo Synthesis of PCDD/PCDF on Fly Ash of Municipal Waste Incinerators," by Stieglitz, L., Zwick, G., Beck, J. Roth, W., and Vogg, H., *Chemosphere*, Vol. 18, I. 6, pp. 1219–1226, 1989. A surface filter is one with pores on the surface layer of the filter's walls which are small enough to prevent the penetration and embedment of particles into the filter's interior. Preferably, the filter is able to withstand temperatures in the range of 800° to 1200° C. The exact operating temperature will be determined by fuel types and furnace parameters.

During combustion, sorbents comprising carboxylic calcium-magnesium salts or mixtures of sorbents containing calcium, magnesium and other alkali or alkali earth compounds and organic compounds are injected either wet or dry in the post-flame region of the furnace. The sorbent reacts with the $SO_2$, the HCl, and the $NO_x$ in the combustion gas. The gas flows through the filter, and the sorbent and other particulates, such as unburned carbon, become embedded in the surface layer of the filter. As the gases continue to flow through the filter, the reactions with the unreacted fraction of the embedded sorbent may continue for a long time, in the order of minutes, allowing high utilization of the sorbent to be achieved. The carboxylic acid-derived (CaO—$CaCO_3$—MgO derived) sorbents are ideal for continuous sulfation due to their high porosity cenospheric structure. Complete burnout of the carbon is also attained.

The filter assembly is fixed within the furnace, typically at or near the exit, preferably in a region where the temperature of the flue gases is at least 500° C. The filter assembly may be a single filter or an assembly of filters placed together. It may be square, cylindrical, or any other configuration to fit the desired location in the furnace. Typically, the filter assembly is separated into two parts or halves. During normal operation, the furnace gases flow through both parts of the filter assembly. Periodically, a gate closes upstream of the filter and prevents the effluent from flowing through one of the two parts. That part is then cleaned (regenerated) aerodynamically, that is, with pulses of compressed air. The dislodged particulates (ash, spent sorbent, etc.) are directed by the regeneration air into a hopper. The regeneration air may be supplied to the filter through an array of nozzles on a pipe which is movable across the surface of the filter. As a result, the entire cross-section of the filter can be regenerated. After one part of the filter has been regenerated, the gate can be swung to close off effluent flow to the other part, so that the other part can be regenerated.

The filter assembly of the present invention can be used with a variety of furnaces, including pulverized fuel boilers, rotary kiln furnaces, fixed hearth furnaces, spreader stokers, and other types of fossil fuel burning furnaces. The fuel may be coal, oil, gas, waste fuel, or other types of waste, such as waste tires, municipal or industrial waste, or hazardous or medical waste.

In a further embodiment, the filter is mounted within the furnace for rotation. While the filter is rotating, a counter-flow stream of compressed air is blown in pulses through the filter to clean the filter. The particulates are collected in a hopper below the jet of air.

DESCRIPTION OF THE DRAWINGS

The invention will be more fully understood from the following detailed description taken in conjunction with the accompanying drawing in which.

DETAILED DESCRIPTION OF THE INVENTION

Figure 6:
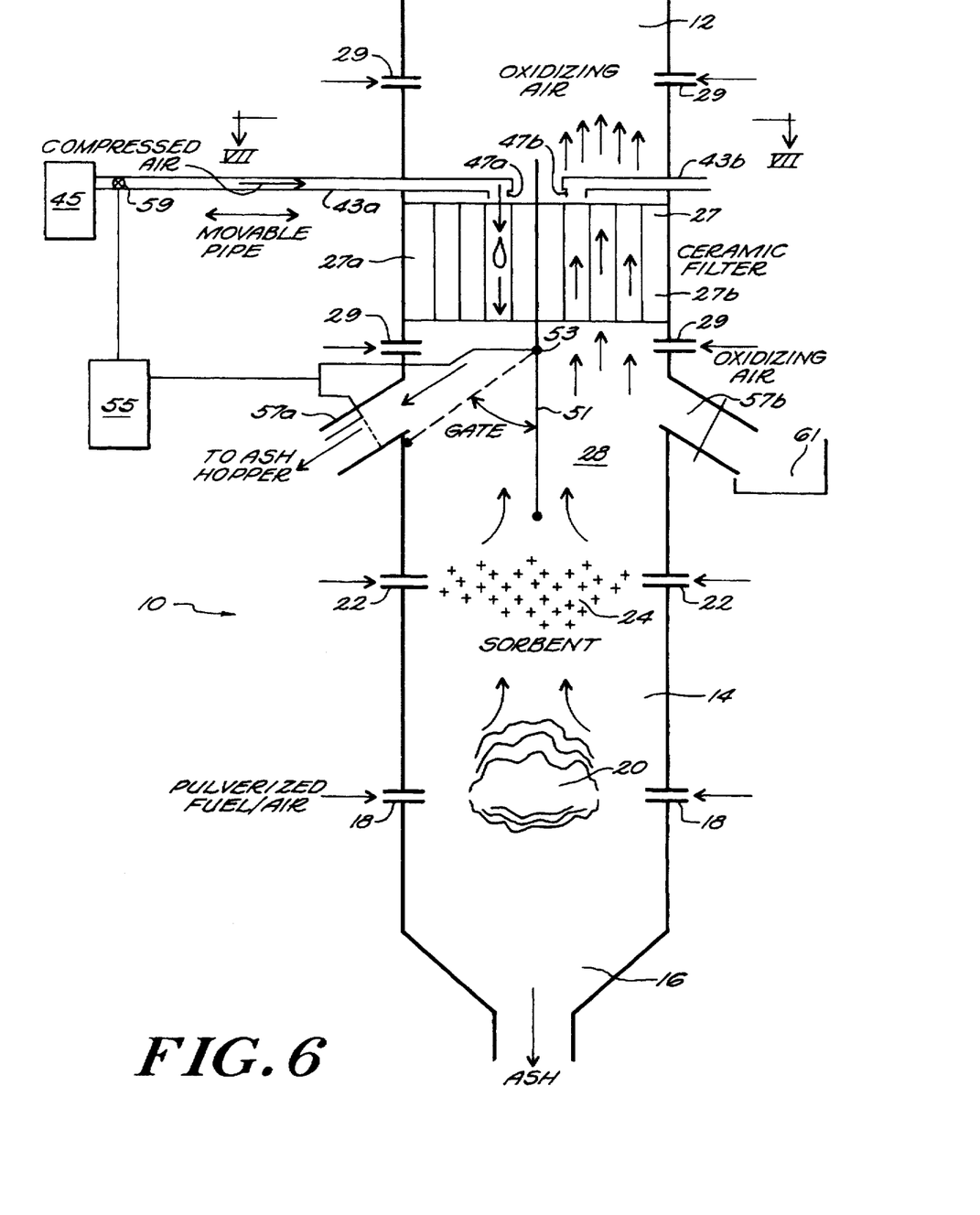
FIG. 6 is a schematic diagram of the fixed filter system of the present invention in a typical furnace application.
Figure 7:
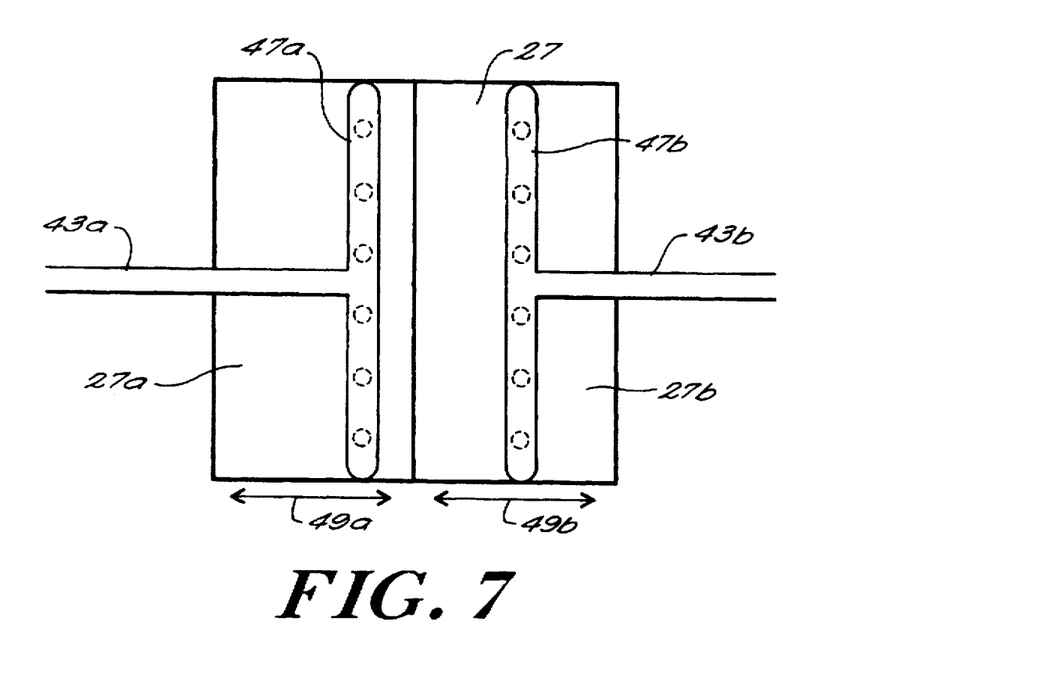
FIG. 7 is a schematic cross-section taken along line VII—VII of FIG. 6.

The present invention is shown schematically in FIGS. 6 and 7 with respect to a coal-fired boiler 10, such as for a utility power plant. An effluent duct 12 at the top of the boiler directs the effluent gases from the furnace 14 to a stack (not shown) or other desired destination. A bottom-ash hopper 16 at the bottom of the furnace 14 collects the bottom ash. Pulverized coal is injected into the boiler through one or more injection ports 18. Combustion occurs in a flame region 20, resulting in exhaust gases containing sulfur compounds, primarily $SO_2$, HCl, $NO_x$, and particulates comprising inorganic ash, unburned carbon (soot), and metal oxides. A suitable sorbent or sorbents are injected via one or more injection ports 22 into the effluent gases in the post-flame region 24, where a portion of the effluent gases reacts with the $SO_2$, the HCl, and the $NO_x$. The typical sorbent particle size range is a few to one hundred microns. Small sizes are preferred. If an aqueous solution of sorbents (for example, carboxylic salts of calcium and magnesium) are injected, fine atomization is preferred.

Suitable sorbents may comprise carboxylic salts of calcium or magnesium, such as calcium magnesium acetate, calcium benzoate, calcium magnesium benzoate, calcium formate, or calcium propionate. Also, mixtures of sorbents containing calcium, magnesium, and/or other alkali and alkali earth compounds, and hydrocarbons may be used. The sorbent may be sprayed wet or dry into the furnace 16. The devolatilizing hydrocarbons react with $NO_x$ to reduce it to $N_2$. The remaining calcined sorbent reacts with the $SO_2$ and HCl to produce stable sulfates and chlorides.

A particle removal device or filter assembly 27 is mounted in the effluent flow path 28 in a space above the sorbent injection port 22 near the entrance of the effluent duct 12. The filter assembly should be capable of operating in a high temperature environment of at least 500° C. and preferably of approximately 1000° C. Preferably, the filter assembly comprises a ceramic monolith having a honeycomb configuration in which adjacent channels, which are aligned generally parallel to the flow path, are plugged at alternate ends. The channel walls are made of a porous material having a pore size which allows the gas to flow into the open-ended channels and pass across the channel walls into the adjacent channels, while blocking the particulates in the gas. In addition, the pores of the channel walls should be small enough, preferably less than 1 μm, to act as surface filters, thereby preventing penetration and embedment of particles in the interior of the walls. The filter assembly preferably has a capture efficiency of at least 90 percent for particles having a mean diameter larger than 1 μm. This type of filter assembly provides a large surface area for filtration and low impedance to the flow and, because the particulates are embedded only in the surface layer, can be readily regenerated with a counterflow of compressed air to dislodge the particles. A suitable filter which has a capture efficiency of 98 to 99 percent or greater for sub-micron-sized particles is shown in U.S. Pat. No. 5,114,581. The filter assembly may be formed of a single filter or a number of filters joined together.

The effluent gas and the sorbent flow into the filter assembly 27, where the sorbent and particulates in the gas become embedded in the surface layer of the filter walls. As gases continue to flow through the filter, the $SO_2$, and HCl, and, to a lesser extent, the $NO_x$ continue to react with the embedded sorbent, allowing high utilization of the sorbent to be achieved. The reactions with the sorbent can continue for several minutes. In addition, combustion of carbon particulates, which become embedded in the filter, may be completed. Catalytically-assisted char-$NO_x$ reactions may also occur.

Oxidizing air may be introduced via suitable ports 29 upstream or downstream of the filter assembly to introduce oxidizing air, as needed, to reduce emissions of unburned gaseous phase hydrocarbons or CO.

It is desirable to periodically regenerate the filter 26 to remove the embedded particulates and spent sorbent. Toward this end, the filter assembly 27 is fixedly mounted within the furnace enclosure and sealed to the interior walls. The entire cross-section of the filter assembly is located across the effluent flow path 28 above the combustion zone of the boiler. The filter assembly is divided into sections, typically two sections, each comprising one half of the filter assembly. Above each half of the filter assembly, a movable pipe or duct 43a, 43b introduces cleaning gas from a source 45 of compressed gas, preferably air, to its associated half of the filter assembly 27. An array 47a, 47b of nozzles is provided at the end of each pipe 43a, 43b to distribute air across a width of the filter assembly. The pipe is movable transversely to the nozzle array across half of the filter assembly, as indicated by the arrows 49a, 49b.

Below the filter assembly, a gate 51 is suspended from a hinge 53 located generally along the midpoint of the filter assembly. During normal operation, the gate hangs vertically below the filter assembly and does not block the effluent flow path to all parts of the filter assembly. When the filter needs cleaning, the gate is pivoted about the hinge to a position indicated in dashed lines, by a suitable mechanism which may be controlled by a suitable controller 55, to close off the flow path to one half 27a of the filter assembly, and a duct 57a leading to a particle collection device is opened. A similar duct 57b associated with the unblocked half 27b remains closed. Effluent gas continues to flow through the unblocked half 27b. Pulses of compressed air are periodically introduced via the pipe 43a associated with the blocked filter half 27a as the pipe 43a travels across the upper face of the filter assembly. The pulses of air dislodge the particulates and spent sorbent embedded in the surface layer of the filter's walls. The pulses may be introduced in any suitable manner, such as by opening a valve 59 from the compressed air source 45. Dislodged particulates and spent sorbent are collected in a particle collection device, such as a hopper 61, outside the furnace. The dislodged particles are disposed of in any suitable manner. The controller 55 may be utilized to operate the valve 59 to introduce the pulses of compressed gas to the filter and open and close the ducts 57a, 57b, as well as to control the gate 51.

In another embodiment, a filter 26 is provided with a cylindrical configuration and is rotatably mounted such that a section 30 of the filter 26 extends into the effluent flow path 28 above the combustion zone of the boiler. Another section 32 of the filter extends outside the effluent flow path 28. The filter is mounted for rotation in any suitable manner, such as by mounting on a central axle 34 which is driven by any suitable mechanism, illustrated schematically in FIG. 1 by pulleys 36 and a belt 38 driven by a motor 40.

Figure 1:
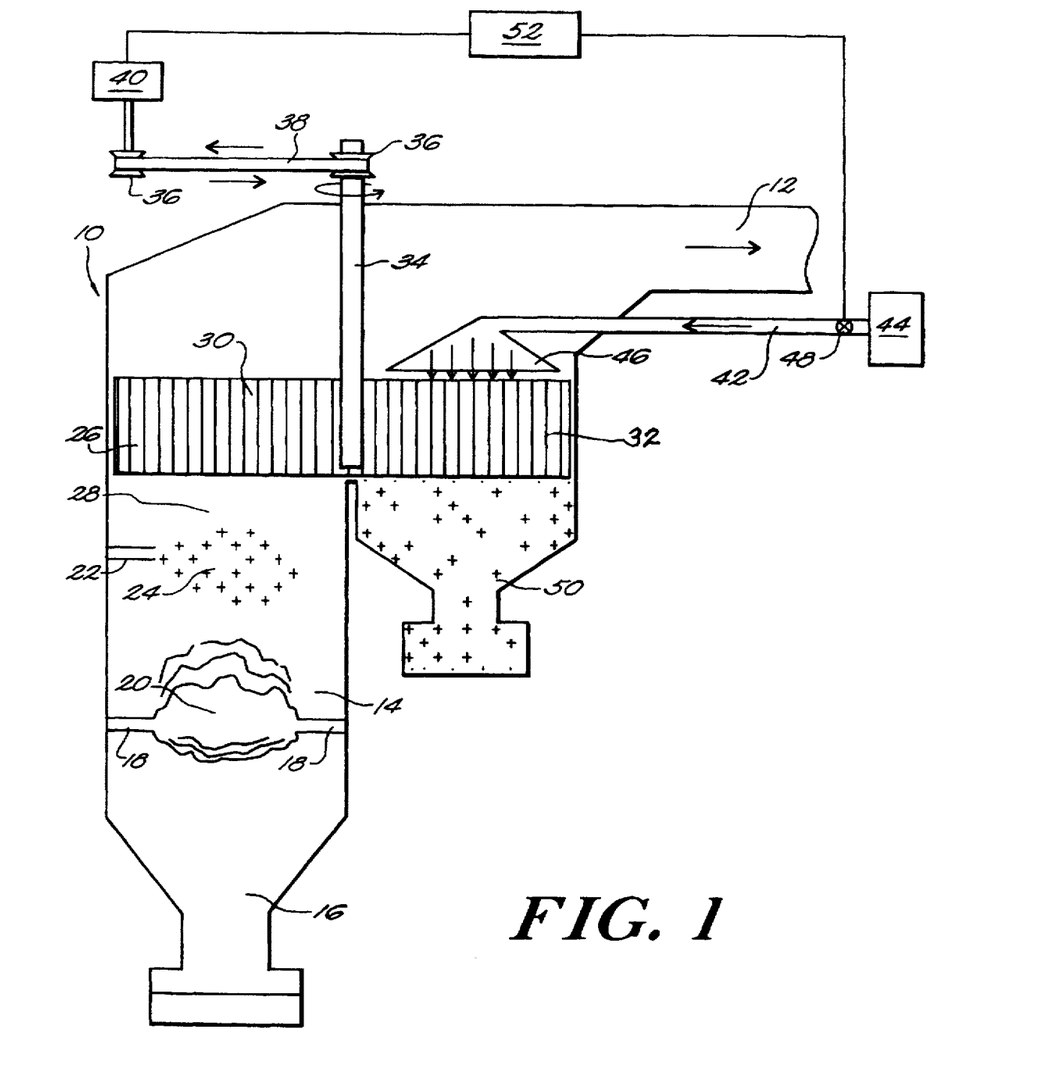
FIG. 1 is a schematic diagram of the rotating filter system of the present invention.

A duct 42 introduces cleaning air from a source 44 of compressed gas, preferably air, to the filter 26. A plenum 46 at the exit of the duct 42 is provided to distribute the air over a sector of the section 32 of the filter which extends outside the effluent flow path. The plenum extends from an inner diameter of the filter to the outer diameter of the filter and covers any suitable, generally wedge or slot-shaped, sector of the filter. Pulses of compressed gas are periodically introduced via the duct 42 to the filter 26 to dislodge the particulates and spent sorbent embedded in the surface layer of the filter's walls. The pulses may be introduced in any suitable manner, such as by opening a valve 48 in the duct 42. Dislodged particulates and spent sorbent are collected in a particle collection device 50, such as a hopper, mounted below the section 32 of the filter which extends outside the flow path through the boiler. The dislodged particles may be disposed of in any suitable manner.

The filter 26 preferably rotates continuously. A rotation rate of 15 to 30 revolutions per hour is suitable. Preferably, the number of pulses of cleaning air and the number of revolutions of the filter are chosen such that division of the number of pulses by the number of revolutions results in a continued fraction that does not terminate. In this way, complete cleaning of all sectors of the filter can be achieved by periodic pulses of the cleaning air. Alternatively, the filter could also rotate in discrete steps, such that when the removal effectiveness of one sector decreases, the filter is rotated to bring a clean sector into the effluent flow path. A controller 52 may be utilized to control the rotation of the filter 26 and to gate the valve 48 to introduce the pulses of compressed gas to the filter.

The filter of the present invention is able to remove 80 to 90 percent of the $SO_2$, HCl, $NO_x$ and particulates in the effluent gas. If the filter is not completely sealed within the boiler to prevent all particulates from passing downstream, additional particulate removal devices (not shown) may be typically provided downstream as well.

The $SO_2$ and $NO_x$ removal process of the present invention was tested in a drop-tube furnace containing a cylindrical honeycomb ceramic filter. The filter was inside the heated zone of the furnace and was kept isothermal at 1100° C. A gas blend containing 2000 ppm of $SO_2$, 500 ppm of $NO_x$, 3% $O_2$, and 12% $CO_2$, with the balance being $N_2$, a composition typical of the effluent of coal-fired power plants, was introduced into the furnace. Particles of a sorbent or sorbent mix of approximately 50 μm in diameter were fluidized in the gas mixture and introduced into the furnace through an injector.

Figure 2:
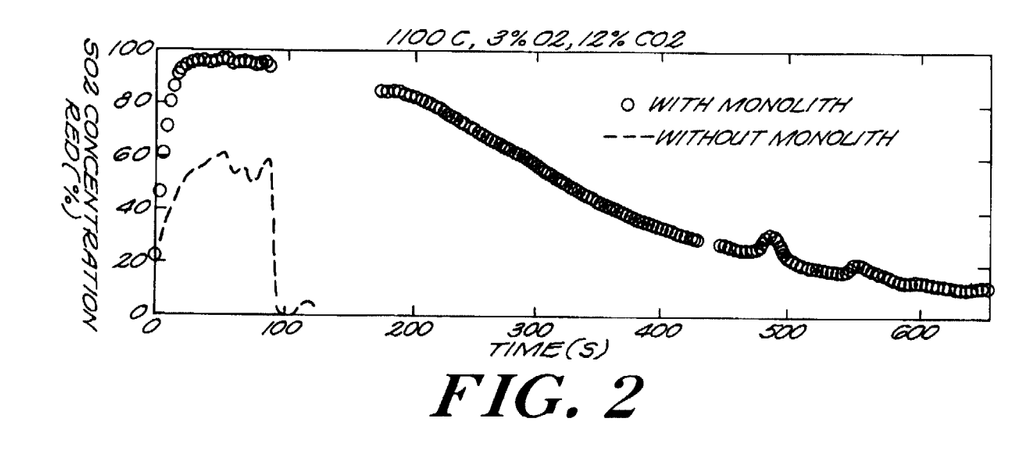
FIG. 2 shows experimental results of $SO_2$ reduction upon injection of a sorbent mix of calcium formate particles and poly(ethylene) particles.
Figure 3:
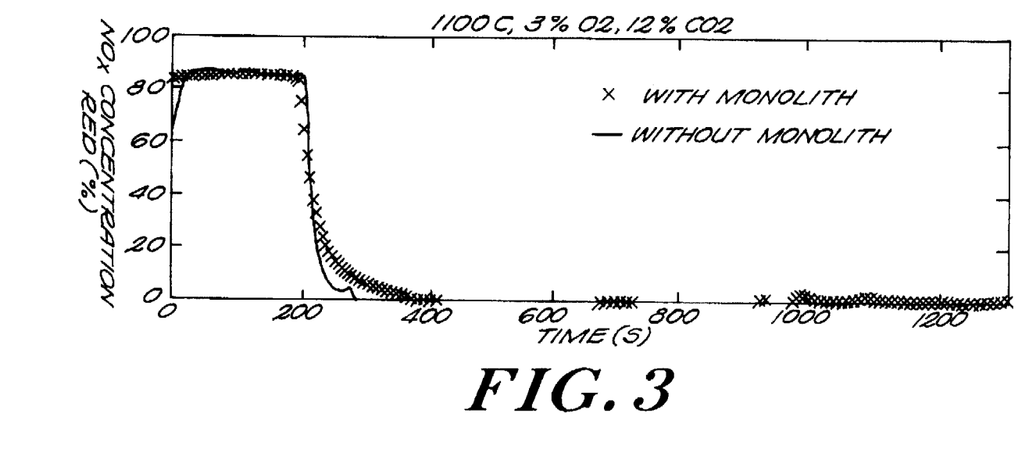
FIG. 3 shows experimental results of $NO_x$ reduction upon injection of the sorbent mix of FIG. 2.

FIGS. 2 and 3 illustrate the results upon injection of a sorbent mix of calcium formate particles and poly(ethylene) particles. The calcium to sulfur molar ratio was 1.3, and the equivalence ratio was 1.5. Upon entering the isothermal cavity of the furnace, the particles reacted with the gases. Initially, the organic components of the sorbent, i.e., the polyethylene and the formate, pyrolyzed and reacted with $NO_x$ homogeneously to reduce it to $N_2$. Subsequently, heterogeneous reaction of the remaining calcium carbonate/oxide solids with the $SO_2$ gas took place to produce calcium sulfate solids. The reaction time of the gases with the particles in suspension was less than 1 sec. The particles were then captured and retained in the filter as the gases continued to flow through the filter. Sulfation continued with time as the particles accumulated in the filter. FIG. 2 illustrates $SO_2$ reduction both with and without the filter in the drop tube furnace. As can be seen, the $SO_2$ reduction increased from 60 percent without the filter to over 95 percent when the filter was used to retain the sorbent in the radiation cavity. Upon switching the sorbent feed off, at approximately 200 sec, sulfation in the filter continued for 10 minutes longer. The $NO_x$ reduction was not affected by the filter (see FIG. 3), since the gas phase reactions between the organic pyrolyzates and $NO_x$ are very fast, unlike the solid CaO (or $CaCO_3$) to gas $SO_2$ reactions that are controlled by pore diffusion.

Figure 4:
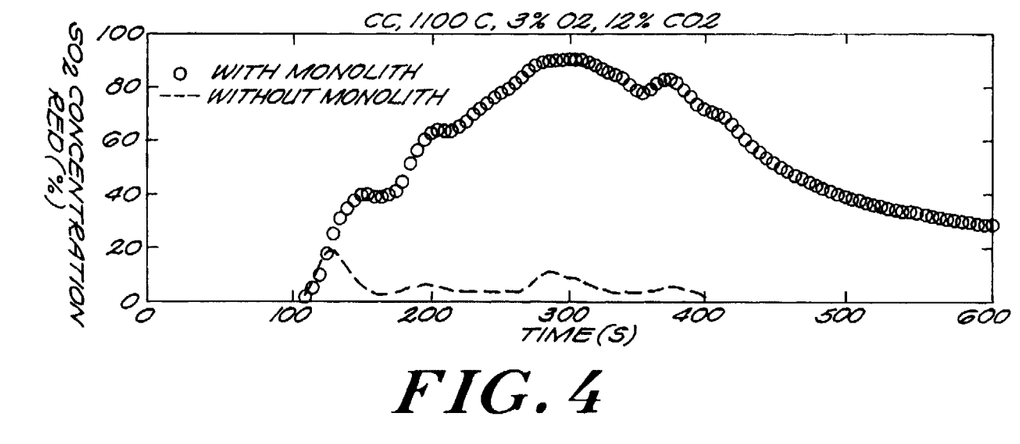
FIG. 4 shows experimental results of $SO_2$ reduction upon injection of solid (low porosity) reagent-grade calcium carbonate.
Figure 5:
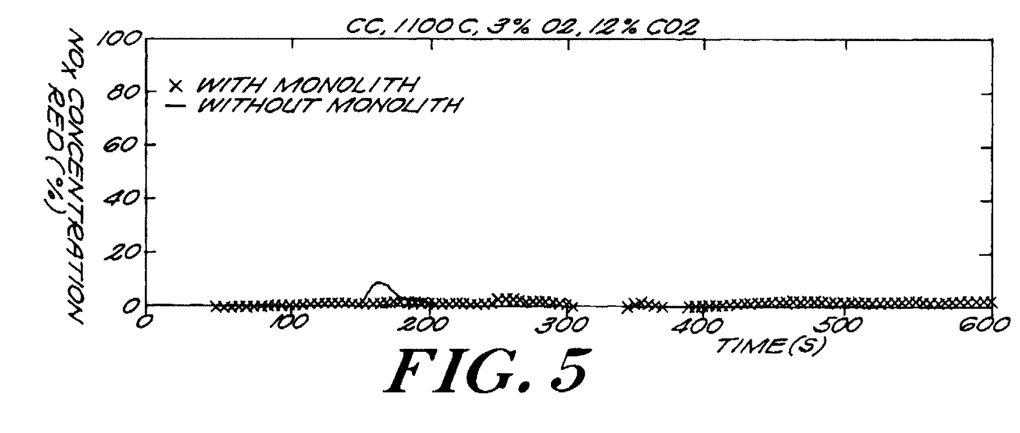
FIG. 5 shows experimental results of $NO_x$ reduction upon injection of the sorbent of FIG. 4.

Even less porous sorbents, such as solid (low porosity) reagent-grade calcium carbonate, performed well in the system of the present invention. As shown in FIG. 4, the $SO_2$ concentration increased from 10 percent without the filter to almost 90 percent with the filter. No $NO_x$ reduction was observed, because the sorbent did not contain any organics (see FIG. 5).

An experiment employing $CaCO_3$ to remove HCl achieved a 36% removal efficiency, without the filter at a calcium to chlorine molar ration of 1 and a residence time of 1 sec. It is expected that higher removal efficiencies can be achieved with more effective sorbents, such as CMA. Even higher removal efficiencies are expected in the presence of a filter.

Figure 8:
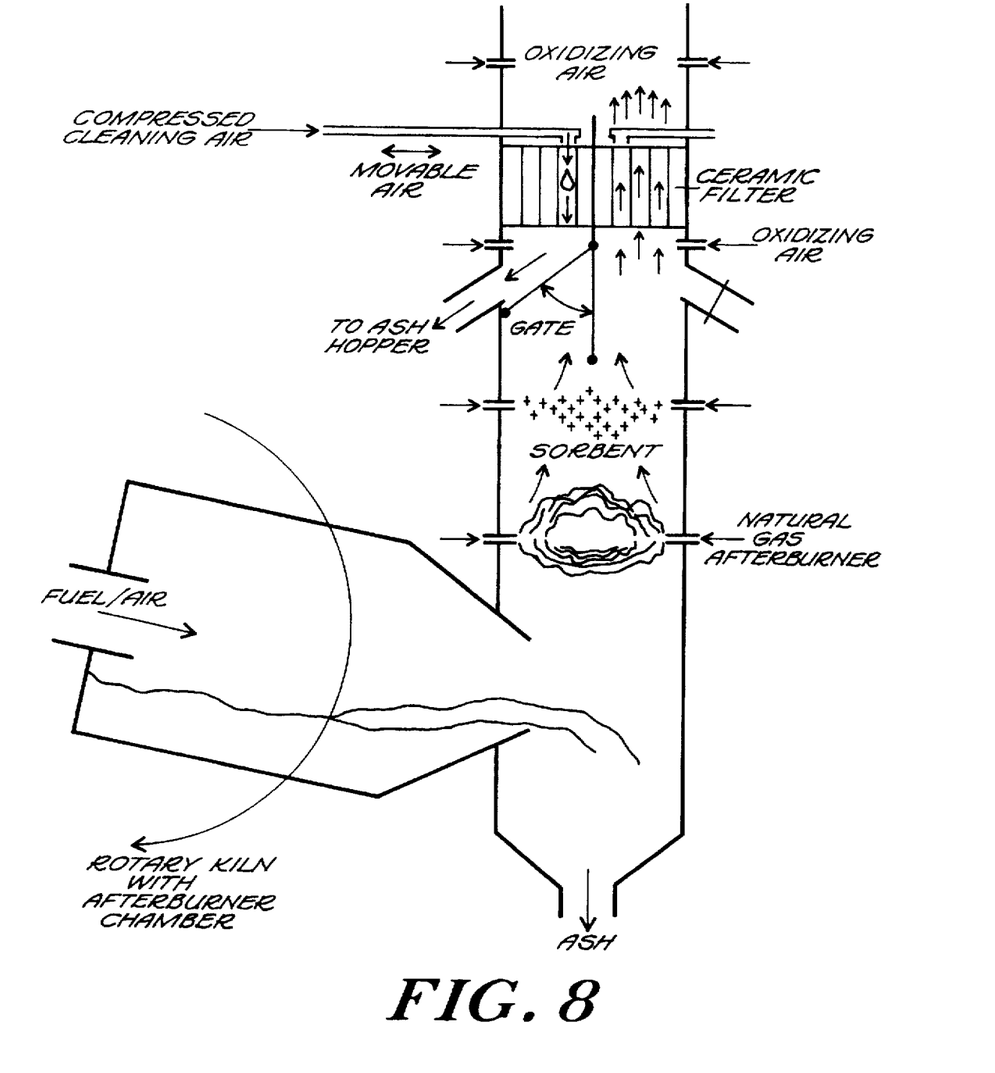
FIG. 8 is a schematic diagram of the fixed filter system of FIG. 6 used in conjunction with a rotary kiln.
Figure 9:
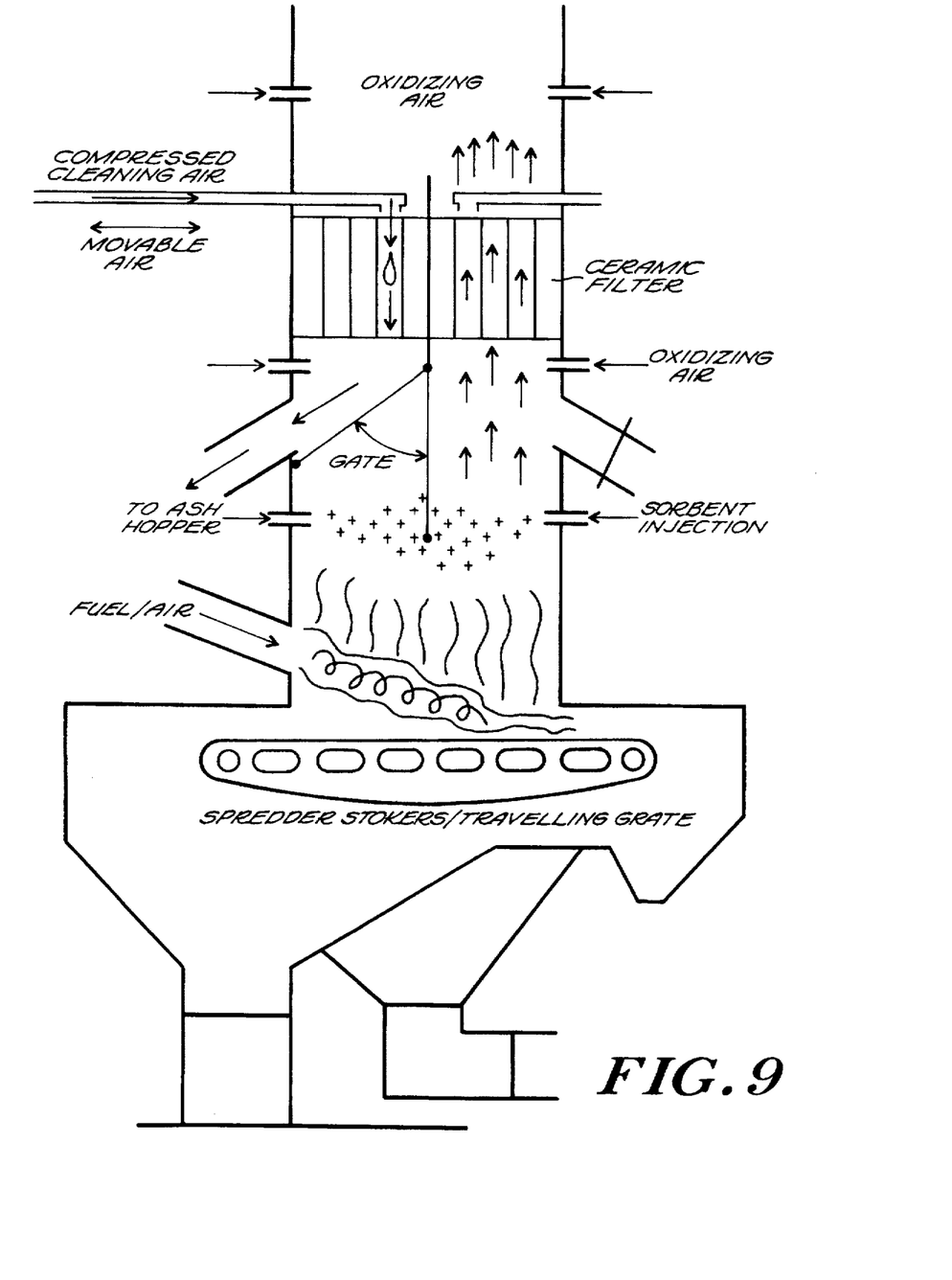
FIG. 9 is a schematic diagram of the fixed filter system of FIG. 6 used in conjunction with a spreader stokers and travelling grate.

Although the invention has been described in conjunction with a coal-fired boiler for a utility power plant, it has application with many combustion processes, including heavy oil-fired utility power plants, industrial furnaces, incinerators, and diesel engines. For example, FIG. 8 illustrates the filter assembly of FIG. 6 in conjunction with a rotary kiln for burning waste, such as municipal, industrial, or medical waste. FIG. 9 illustrates the filter assembly of FIG. 6 in conjunction with a spreader stoker and travelling grate also for the incineration of waste.

Figure 10:
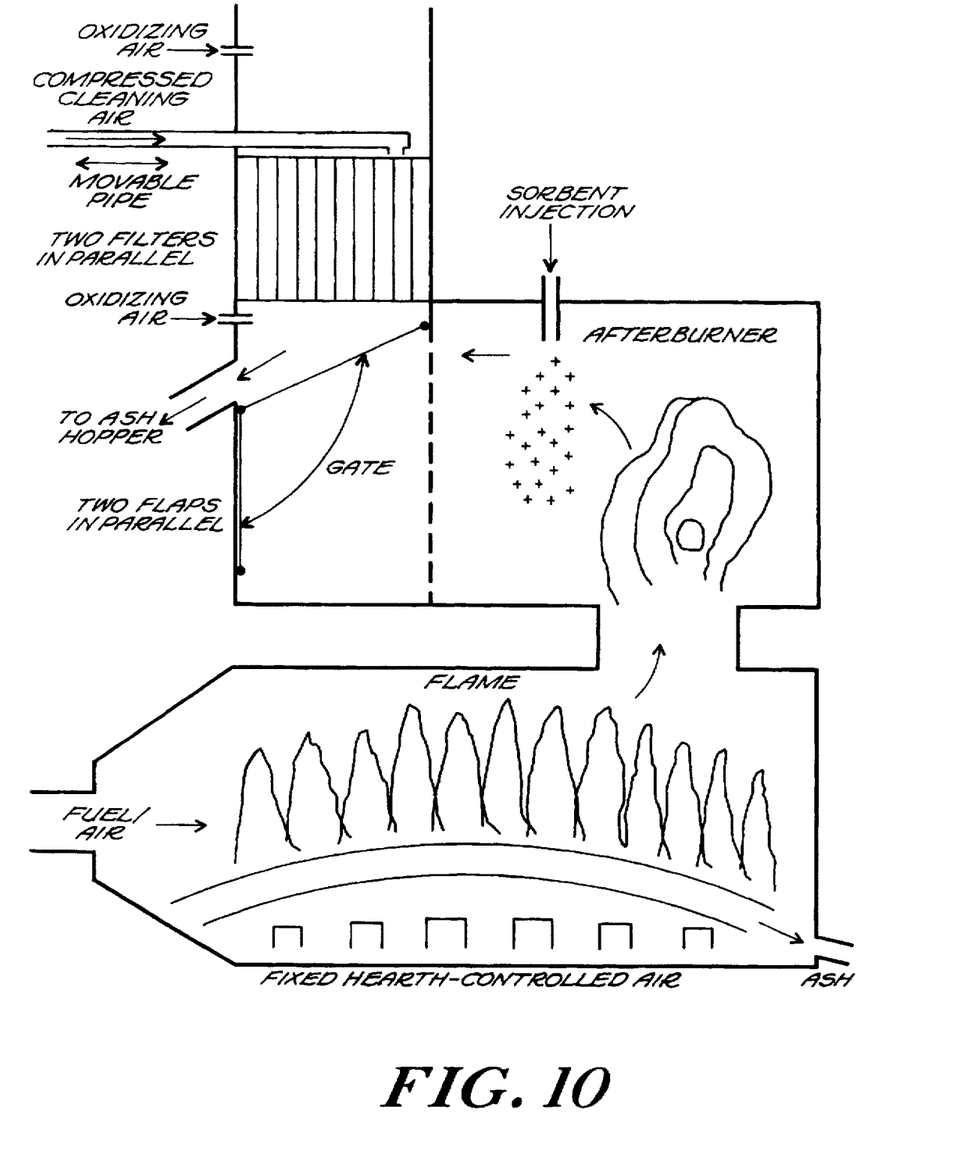
FIG. 10 is a schematic diagram of a further embodiment of the fixed filter system of the present invention used in conjunction with a fixed hearth-controlled air furnace.

FIG. 10 illustrates a further embodiment of a fixed filter assembly, in which two or more gates or flaps are provided in parallel, each associated a filter section. A movable pipe, as described above, is also provided in association with each section. During normal operation, all gates are open to allow the effluent to flow through all filter sections. During regeneration, one or more gates are operated to close the flow path through their associated filter sections. At least one filter section remains open to effluent flow. After the first section or sections are regenerated, their associated gates are opened, and other gates are closed to allow regeneration of the other filter sections.

Additionally, while the preferred embodiment employs sorbents capable of simultaneous $SO_2$, HCl, and $NO_x$ removal, other sorbents, even if capable of removing only sulfur compounds, may be advantageously employed with the present invention. Accordingly, the invention is not to be limited by what has been particularly shown and described, except as indicated by the appended claims.

I claim:

1. A process for removing $NO_x$, sulfur compounds, hydrogen chloride, and particulate pollutants from a fossil fuel fired combustion process comprising the steps of:

burning a fossil fuel in a flame region in a furnace and directing effluent gas from the flame region to an effluent duct coupled to said furnace;

injecting a sorbent via a sorbent injection port into said furnace at a location downstream of the flame region and upstream of said effluent duct, wherein the sulfur compounds, the hydrogen chloride, and the $NO_x$ in the effluent gas react with the sorbent;

collecting the partially reacted sorbent and the particulate pollutants in the effluent gas in at least a portion of a ceramic filter assembly coupled to said furnace downstream of said sorbent injection port and upstream of said effluent duct, said filter assembly having pores sized to capture the sorbent and the particulate pollutants in the effluent gas while allowing passage of the effluent gas through said filter assembly, wherein the sorbent collected in said filter assembly continues to react with the sulfur compounds, the hydrogen chloride, and the $NO_x$ in the effluent gas and carbon particles collected on the filter assembly burn;

periodically regenerating said filter assembly by providing a pulse of compressed gas to at least a portion of said filter assembly outside of the flow path of the effluent gas to dislodge particles of spent sorbent and the particulate pollutants from the effluent gas embedded in said filter assembly.

2. The process of claim 1, wherein said sorbent comprises a salt of calcium or magnesium.

3. The process of claim 2, wherein said sorbent comprises a carboxylic salt of calcium or magnesium.

4. The process of claim 2, wherein said salt comprises calcium magnesium acetate, calcium benzoate, calcium magnesium benzoate, calcium formate, or calcium propionate.

5. The process of claim 1, wherein said sorbent comprises a mixture of calcium, magnesium, alkali compounds, or alkali earth compounds, and a hydrocarbon.

6. The process of claim 1, wherein said regenerating step comprises blocking a portion of said filter assembly from flow of the effluent gas prior to providing said pulse of compressed gas to at least a portion of said filter assembly.

7. The process of claim 1, wherein said regenerating step comprises:

rotating said filter assembly to periodically dispose a section of said filter assembly in a flow path of the effluent gas and to periodically dispose a further section of said filter assembly outside of the flow path of the effluent gas, prior to providing said pulse of compressed gas to said further section of said filter assembly.

8. The process of claim 7, wherein said regenerating step further comprises rotating said filter assembly continuously and providing a plurality of pulses of compressed gas periodically, wherein the result obtained by division of the number of pulses of compressed gas by the number of revolutions of said filter assembly is a fraction that does not terminate.

9. The process of claim 7, further comprising collecting said particles of spent sorbent and the particulate pollutants in a particle collection device disposed below said further section of said filter assembly.

10. The process of claim 1, wherein said filter assembly comprises a ceramic monolith having a honeycomb configuration having adjacent channels plugged at alternate ends.

11. The process of claim 1, further comprising collecting at least 90 percent of particles having a mean diameter of 1 µm.

12. The process of claim 1, further comprising collecting the partially reacted sorbent and the particulate pollutants at a temperature of at least 500° C.

13. The process of claim 1, further comprising collecting the partially reacted sorbent and the particulate pollutants at a temperature of 800° C. to 1200° C.

* * * * *

UNITED STATES PATENT AND TRADEMARK OFFICE
CERTIFICATE OF CORRECTION

PATENT NO. : 5,785,936
DATED      : July 28, 1998
INVENTOR(S) : Yiannis A. Levendis It is certified that error appears in the above-identified patent and that said Letters Patent is hereby corrected as shown below:

On the title page, item [54]

In the Title, line 2, "HCL" should read --HC1--.

Column 1, line 2, In the Title, "HCL" should read --HC1--.

Signed and Sealed this

Twelfth Day of October, 1999

Attest:

Attesting Officer

Q. TODD DICKINSON

Acting Commissioner of Patents and Trademarks